United States Patent [19]
Roberts

[11] Patent Number: 5,619,375
[45] Date of Patent: Apr. 8, 1997

[54] MIRROR COATING

[75] Inventor: John K. Roberts, Sheboygan, Wis.

[73] Assignee: K. W. Muth Company, Inc., Sheboygan, Wis.

[21] Appl. No.: 544,064

[22] Filed: Oct. 17, 1995

Related U.S. Application Data

[63] Continuation-in-part of Ser. No. 163,838, Dec. 7, 1993, Pat. No. 5,528,422.

[51] Int. Cl.$^6$ .............. G02B 1/10; G02B 5/26; G02B 5/28
[52] U.S. Cl. .......... 359/584; 359/588; 359/589; 359/884
[58] Field of Search .............. 359/359, 360, 359/580, 584, 585, 586, 588, 589, 883, 884, 613, 603, 608, 583, 839

[56] References Cited

U.S. PATENT DOCUMENTS

| | | | |
|---|---|---|---|
| 2,519,545 | 8/1950 | Colbert et al. | 88/105 |
| 2,590,906 | 4/1952 | Tripp | 88/110 |
| 4,247,167 | 1/1981 | Tokuhara et al. | 350/166 |
| 4,507,547 | 3/1985 | Taga et al. | 219/543 |
| 4,673,248 | 6/1987 | Taguchi et al. | 350/166 |
| 4,799,745 | 1/1989 | Meyer et al. | 359/360 |
| 4,805,989 | 2/1989 | Nakajima | 350/164 |
| 4,921,331 | 5/1990 | Nakajima | 350/164 |
| 4,979,802 | 12/1990 | Ichikawa | 350/164 |
| 5,014,167 | 5/1991 | Roberts | 362/83.1 |
| 5,200,855 | 4/1993 | Meredith, Jr. et al. | 359/388 |
| 5,207,492 | 5/1993 | Roberts | 362/30 |
| 5,337,191 | 8/1994 | Austin | 359/885 |
| 5,339,198 | 8/1994 | Wheatly et al. | 359/359 |
| 5,341,238 | 8/1994 | Trost et al. | 359/580 |
| 5,407,733 | 4/1995 | Bjornard et al. | 359/589 |
| 5,473,468 | 12/1995 | Rudigier et al. | 359/359 |
| 5,528,422 | 6/1996 | Roberts | 359/583 |

Primary Examiner—Ricky D. Shafer
Attorney, Agent, or Firm—Wells, St. John, Roberts, Gregory & Matkin, P.S.

[57] ABSTRACT

A mirror coating which provides improved performance characteristic to a mirror assembly, and which includes a non-periodic succession of materials which exhibit neutral reflected chromaticity, and which has a luminous reflectance of greater than 50%.

2 Claims, 6 Drawing Sheets

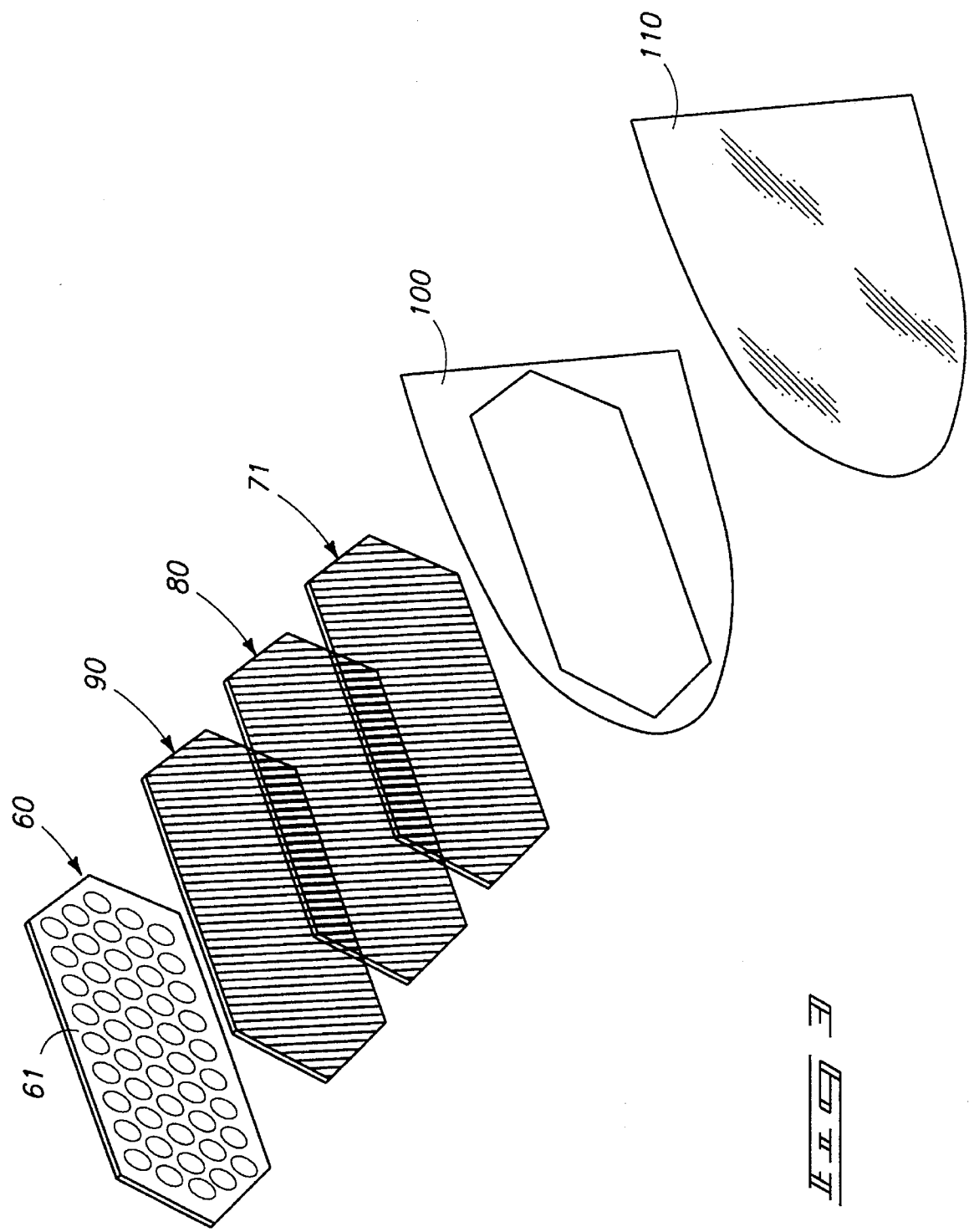

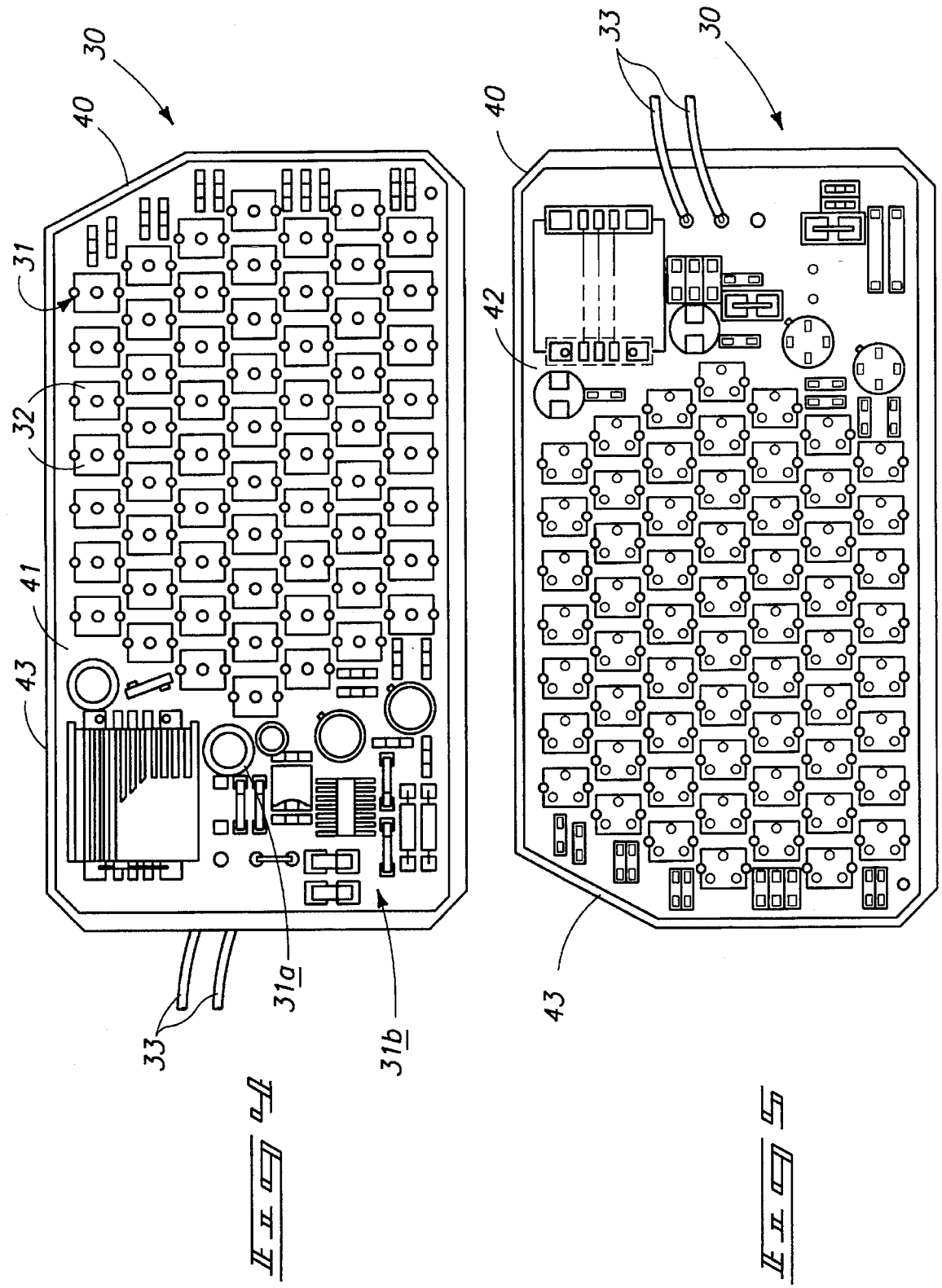

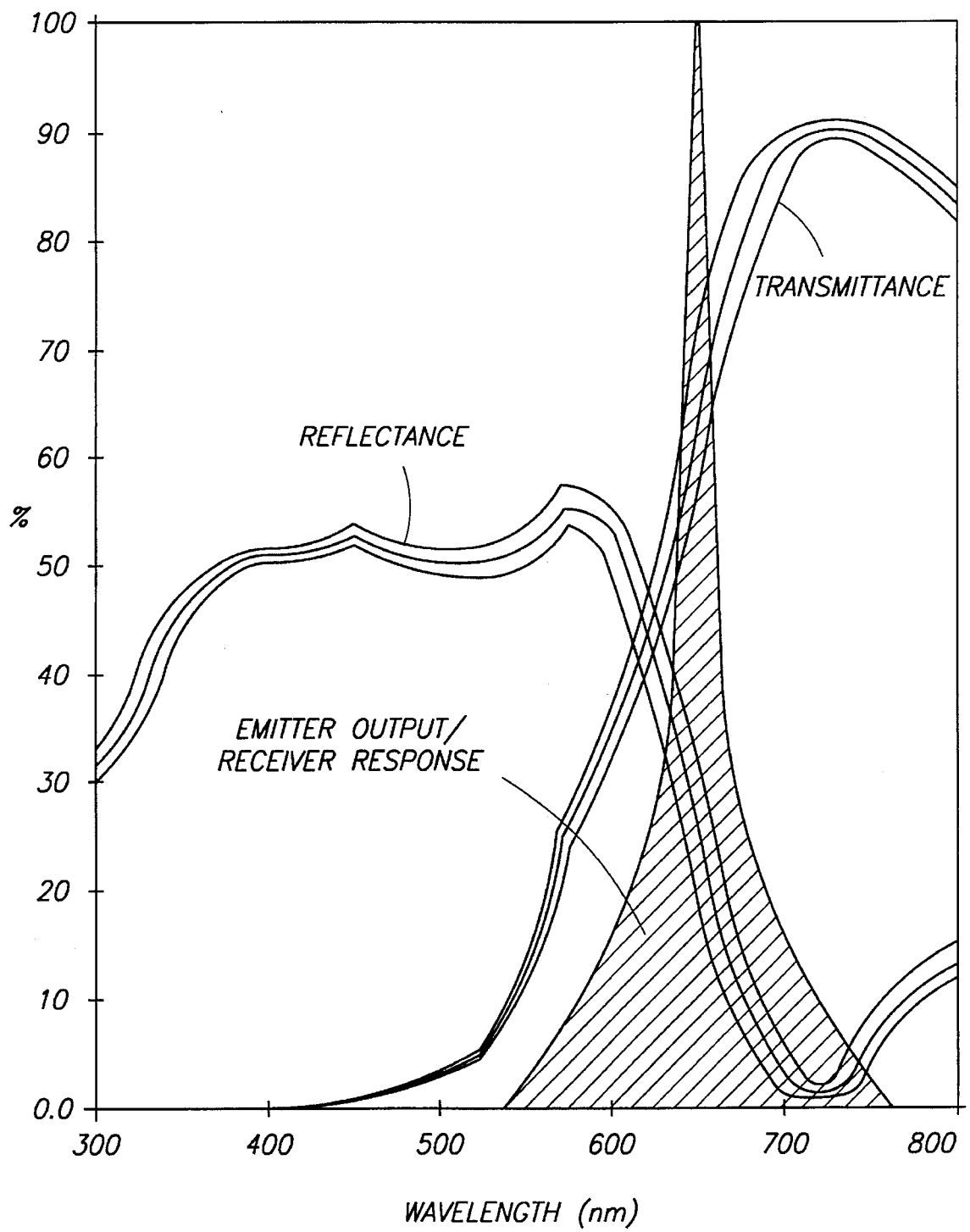

MIRROR COATING

The present application is a Continuation-in-Part of application Ser. No. 081/163,838, filed on Dec. 7, 1993, now U.S. Pat. No. 5,528,422.

SPECIFICATION

1. Field of the Invention

The present invention relates to a mirror coating and more specifically, to a mirror coating which provides improved performance characteristics relative to a mirror assembly and which includes a subassembly which may emit, or receive, electromagnetic radiation in predetermined spectral bands which may be visible, or invisible.

2. Description of the Prior Art

The beneficial effects of employing auxiliary or so called third brake lamps [center high mounted stop lamps] has been known for some time. Further, the inventor hereof has disclosed improved mirror assemblies which augment center high mounted stop lamps [CHMSL] and which provide additional laudatory benefits. These mirror assemblies are disclosed in U.S. Pat. Nos. 5,014,167 and 5,207,492, to name but a few, both of which are incorporated by reference herein.

The mirror assemblies disclosed in the above-captioned patents utilize dichroic mirrors which are operable to reflect a broad band of electromagnetic radiation within the visible light portion of the spectrum while simultaneously permitting electromagnetic radiation having wavelengths which reside within a predetermined narrow spectral band, (sometimes referred to as in-band radiation) to pass therethrough. In this fashion, the dichroic mirror remains an excellent visual image reflector, that is, achieving luminous reflectance which is acceptable for automotive applications, for example, while simultaneously achieving an average transmittance in the predetermined spectral band of at least 58%. When the predetermined band pass region is relatively narrow, that is, such as 30 nanometers or less, average in-band transmittance of 80% or more can be achieved, with peak transmittance in excess of 95% being common.

As disclosed in the previous patents, selective spectral bands of visible light or invisible electromagnetic radiation can be utilized for various applications. Spectral bands corresponding to the visible colors red, blue, green, and yellow as well as non-visible spectral bands such as infrared, ultraviolet or microwave may be selected for applications which include providing visual signals or displays to an operator of the vehicle, or to those in adjacent vehicles, or in the alternative, providing an environment where active or passive sensors of assorted construction may be placed in an advantageous and concealed location behind a corresponding mirror surface such that the sensors may achieve various advantageous functions.

While the mirror assemblies disclosed in the above-identified patents have operated with a great deal of success, certain inherent physical features or characteristics of the earlier disclosed mirror assemblies utilizing dichroic mirrors have detracted from their aesthetic acceptability in certain environments. More specifically, and depending upon the band of electromagnetic radiation which is emitted, or received, by the mirror assembly, the reflective surface of these dichroic mirrors, as viewed in natural light, may appear to have various colors, or tints which, while not detracting from their usefulness, may not be entirely aesthetically appealing in all automotive applications. For instance, when mirror assemblies are employed which are operable to emit visible light which is in the spectral band which includes the color red, the dichroic mirrors employed with same can appear, under normal ambient lighting conditions, to have a slight blue color or tint. Further, and when these same mirror assemblies are viewed under ambient lighting conditions, it is possible, under some circumstances, as for example, in extremely bright sunlight, to see the outline of the underlying sensors or light emitting assemblies upon close examination.

Another perceived limitation in these same dichroic mirrors relates to the ability of the dichroic mirrors to pass certain wavelengths of light other than the predetermined narrow spectral band pass selected which, over a prolonged period of time, may have deleterious consequences for the subassemblies of the mirror assembly which may be bonded or fastened together using various polymeric based adhesives. More specifically, adhesive compositions using various polymeric based substances may degrade when exposed for prolonged periods of time to ultraviolet light to such a point that the adhesive bonds weaken and fail. Consequently, the inventor has continued to investigate various improved mirror coatings which can be used in the aforementioned mirror assembly, and which will, to a much greater extent, substantially conceal the underlying sensors or light emitting subassemblies, provide a substantially neutral chromatic appearance, and simultaneously absorb wavelengths of electromagnetic radiation which may otherwise be transmitted into the mirror assembly and which, over time, will degrade or otherwise be harmful to the subassemblies concealed by the mirror.

Other previous coatings such as that disclosed in U.S. Pat. No. 5,200,855 to Meredith et al. have been found to be substantially inadequate in satisfying the new aesthetic and operational requirements discussed, above. In this regard, the patent to Meredith et al. discloses a mirror coating which has a periodic, layered structure. For purposes of this application, the word periodic has its normal well-accepted meaning, that is, the individual layers recur at regular intervals; i.e., each layer has the same thickness. While this periodic structure provides several advantages, for example, it provides for ease of computation with respect to the calculation of the optical requirements of the coating, it does not, however, yield coating performances which meet the operational parameters disclosed above. For example, these periodic stacks, which are expressed as $[H\ L\ H]_n$, wherein N equals 2 or 3, are primarily useful in producing high purity, red or orange transmission filters. These filters, however, have severe limitations in that moderately high, neutrally chromatic reflectance, high in-band transmittance and substantial out-of-band absorbance are not substantially achievable simultaneously with such a coating.

In the present invention, however, the inventor has departed from the teachings of the prior art and has provided a mirror coating which has a non-periodic stack of materials, whose layers have irregular thicknesses, and where one of the materials has a wavelength dependent, complex refractive index. Accordingly, an optimized coating is achievable which readily satisfies the various characteristics discussed above, that is, the mirror has an acceptable luminous reflectance, has substantially neutral chromaticity when viewed with ambient natural light, has high in-band transmittance, and further has moderate out-of-band absorbance.

Therefore, the present invention, when applied to a transparent or translucent substrate, creates a mirror which may be utilized in a mirror assembly, as disclosed in the prior art, and which further provides a means for enclosing an emitter, or receiver of electromagnetic radiation which are individually operable to provide various signals to the operator of an overland vehicle, adjoining observers, or nearby electromagnetic receivers or sensors; and which further substantially conceals the underlying emitters or receivers, while simultaneously providing a neutrally reflective appearance when viewed under ambient lighting conditions, and further is an excellent reflector of ambient light in the form of reflected perceivable images, and an excellent transmitter of the predetermined bands of electromagnetic radiation which are emitted or received by the subassemblies which are concealed by the mirror.

OBJECTS AND SUMMARY OF THE INVENTION

Therefore, it is an object of the present invention to provide an improved mirror coating.

Another object of the present invention is to provide a mirror coating which may be utilized with a mirror assembly, and wherein the mirror assembly may be manufactured and installed as original equipment on an overland vehicle and the like, or which may further be manufactured in the manner of a retrofit.

Another object of the present invention is to provide a mirror coating which may be utilized with a mirror assembly, and wherein the mirror, and mirror coating, may be readily installed or integrated with other mirror technology such as motorized actuators, heater elements and films of various types including electrochromic dimming films.

Another object of the present invention is to provide a mirror coating containing one or more layered materials having a complex refractive index which is wavelength dependent, and wherein the real component of the refractive index is dominant, and the imaginary component is negligible within a predetermined spectral band pass region, and further the imaginary component is substantial within a selected spectral region other than the predetermined band pass region.

Another object of the present invention is to provide a mirror coating which exhibits substantially neutral reflected chromaticity as observed with reflected ambient light, has a peak transmission of not less than 60% within a selected spectral band pass region, and a peak absorbance of not less than 30% within a spectral region other than the predetermined spectral band pass region, while simultaneously maintaining greater than 50% luminous reflectance.

Another object of the present invention is to provide a mirror coating which is operable to impede the passage of predetermined wavelengths of light other than those in the predetermined spectral band pass region thereby further obscuring or otherwise making indiscernible the sensors or other light emitting or receiving subassemblies positioned behind the mirror under various ambient lighting conditions, or alteratively, protecting the sensors or emitters or other internal assemblies from undesired excessive exposure to deleterious out-of-band radiation.

Another object of the present invention is to provide a mirror coating which provides substantially neutral reflected chromaticity over a broad range of angles of incidence, [AOI] while simultaneously providing greater than 50% luminous reflectance.

Another object of the present invention is to provide a mirror coating which includes a non-periodic series or stack of materials having irregular thicknesses, and which are operable to provide an optimized combination of the characteristics noted above.

Another object of the present invention is to provide a mirror coating which is operable to obtain the individual benefits to be derived from related prior art assemblies and compositions, while avoiding the detriments individually associated therewith.

Further objects and advantages are to provide improved elements and arrangements thereof in a mirror coating, and related mirror assembly, for the purposes intended, and which is dependable, economical, durable, and fully effective in accomplishing these intended purposes.

These and other objects and advantages are achieved in a mirror coating, and wherein the mirror coating includes a non-periodic stack or succession of materials in a layered interference filter structure, and wherein the mirror coating exhibits substantially neutral reflected chromaticity as observed with reflected ambient light; has a peak transmittance not less than 60% within a predetermined spectral band pass region; has a peak absorbance not less than 30% within a region other than the predetermined spectral band pass region, while simultaneously achieving a luminous reflectance of greater than 50% for the ambient light striking the mirror coating.

BRIEF DESCRIPTION OF THE DRAWINGS

FIG. 3 is a partial, exploded, perspective view of a portion of the mirror assembly which utilizes the mirror coating of the present invention.

FIG. 4 is a top plan view of the electronic circuit board shown in FIG. 2 with the hexagonal reflectors removed.

FIG. 5 is a bottom plan view of the circuit board shown in FIG. 4.

FIG. 6 is a graphic illustration of reflectance, transmittance, and absorbance as compared with wavelength for a mirror coating composition of the present invention, along with a graphic illustration of an emitter or receiver response.

DESCRIPTION OF PREFERRED EMBODIMENT

Figure 1:
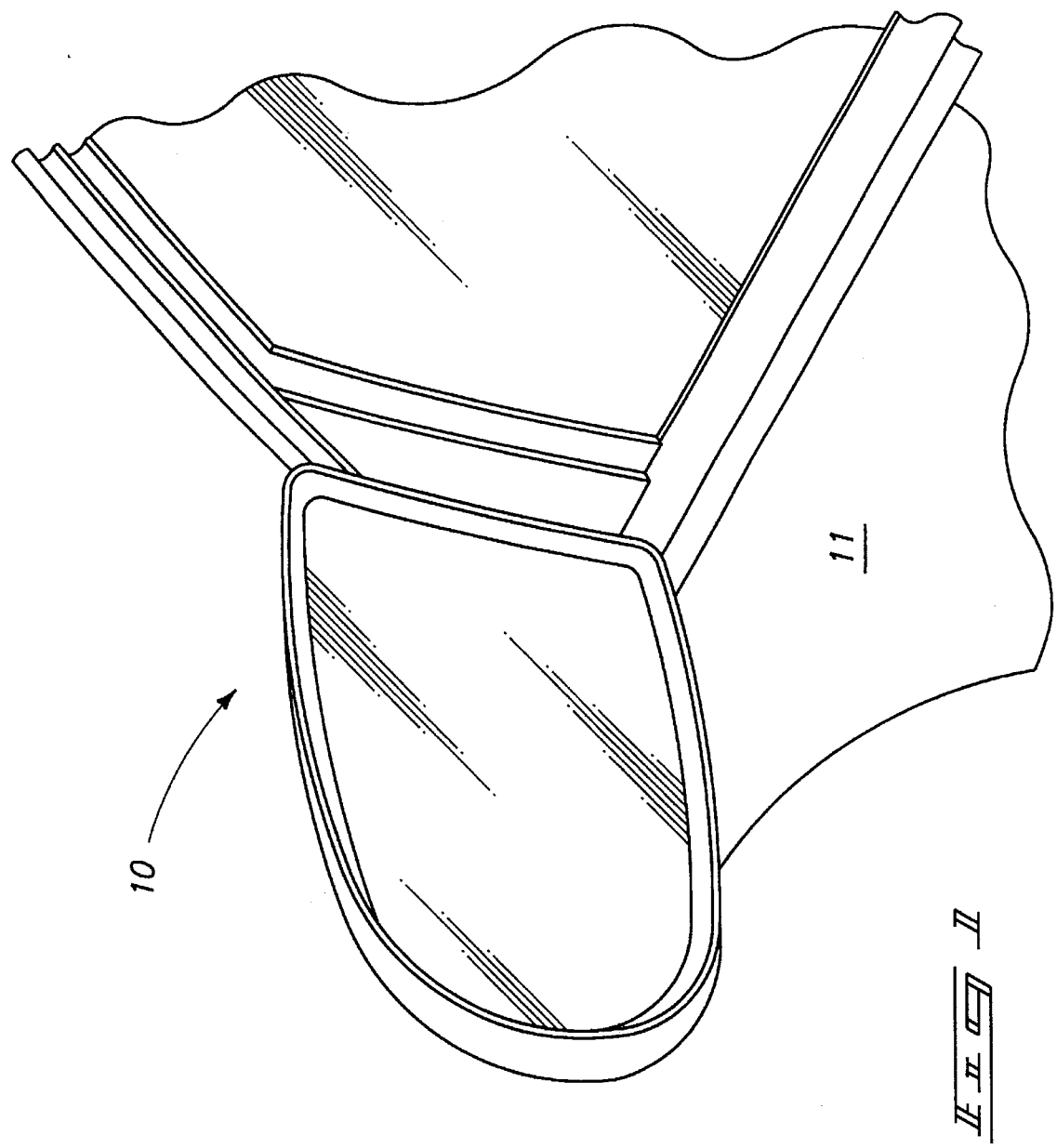
FIG. 1 is a perspective environmental view of a mirror assembly utilizing the mirror coating of the present invention.
Figure 2:
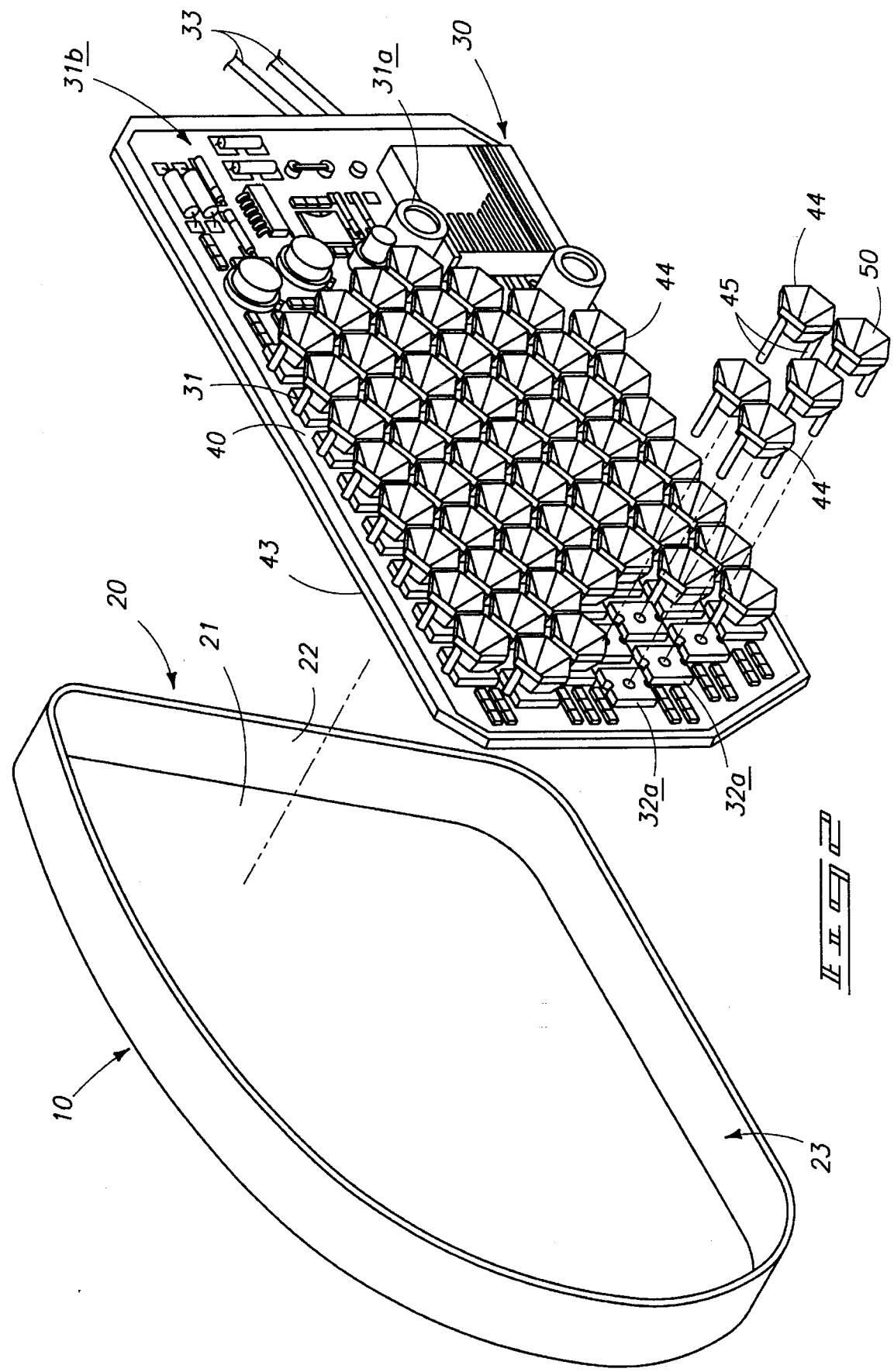
FIG. 2 is a partial, exploded, perspective view of a portion of the mirror assembly which utilizes the mirror coating of the present invention.
Figure 7:
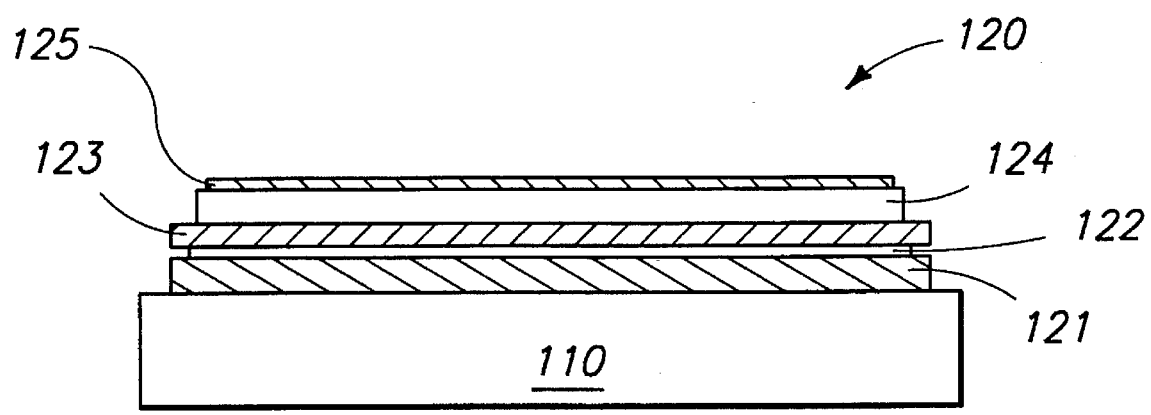
FIG. 7 is a greatly enlarged, graphic, vertical sectional view of the mirror coating composition of the present invention.

Referring more particularly to the drawings, the mirror coating, in its various forms, finds usefulness when utilized in combination with a mirror assembly 10 which is best illustrated in the perspective view of FIG. 1, and the exploded views which are shown in FIGS. 2 and 3, respectively. Further, FIG. 7 provides a graphic depiction of the present mirror coating and illustrates the non-periodic, stacked arrangement of the materials. The various forms of the present invention will be discussed in greater detail hereinafter.

For convenience sake, the mirror assembly which is shown and described herein is illustrated as it would be configured if it were installed on an overland vehicle (not shown) and which is of conventional design, and wherein the mirror assembly may be mounted on the vehicle in place of the rearview mirror which is normally located in the passenger compartment or, as shown in FIG. 1, in place of the sideview mirrors which are mounted on the exterior surface 11 of the overland vehicle. As best seen by reference to FIGS. 1 and 2, the mirror assembly 10 is mounted on the exterior surface 11 of the overland vehicle by means of a housing 20 which includes a substantially continuous rear wall 21, and a side wall 22 which extends generally normally, and substantially forwardly relative thereto. It should be understood that the word "forward" when referring to the mirror assembly means the mirror assembly is oriented in a fashion which permits viewing rearwardly of the overland vehicle when an operator is seated in the passenger compartment of the overland vehicle. The side wall 22 defines an aperture 23 of predetermined dimensions.

The housing 20 is operable to enclose all manner of assemblies, devices, and/or sensors which may individually operate as a receiver, emitter, or transceiver of electromagnetic radiation 30. These receiver(s) or emitter(s) operate to produce or receive wavelengths of electromagnetic radiation which are substantially matched to the peak wavelength transmittance characteristics of a mirror which is borne by the enclosure or housing and disposed in substantially occluding relation relative to the aperture 23. The mirror and its characteristics as well as the coating composition utilized with same will be discussed in greater detail hereinafter. For purposes of this invention, however, it should be understood that the terms "transmit" or "transmittance" shall mean the passage of electromagnetic radiation, regardless of direction, through the associated mirror. Further, the terms "pass" or "passage" shall also describe the same phenomena. Additionally, the phrase "interference filter" means a filter that controls the spectral composition of transmitted energy partially by the effects of interference. In this regard, these filters are made up of thin layers of conductive, semiconductive, or dielectric materials which act, in combination, to produce a filter which has high transmission in narrow spectral bands. Still further, the word "periodic" shall mean the recurring use of material in the coating, with each recurring layer having the same thickness. In the present form of the invention as shown in FIG. 1, the receiver(s) and/or emitter(s) of electromagnetic radiation 30 emit and/or receive light having wavelengths which include the 630 through 680 nanometer band, and which physically manifests itself as the perceived color red. The invention, however, is not limited to the peak wavelengths recited herein, but may further be used with any chosen wavelength band such that any visual spectrum color can be seen, or any invisible spectral band may be emitted, or received. Further, the present invention could also include more than one or a combination of sources or receivers of electromagnetic radiation.

The receiver(s) and/or emitter(s) of electromagnetic radiation 30 are depicted herein as including a modular LED [Light Emitting Diode] array or bank of LEDs 31 which are individually mounted on a circuit board 40, and which are operable to produce visible light having the wavelengths which include the 630 through 680 nanometer band. Additionally, a photo detector 31a is depicted in FIGS. 2 and 4 and which is operable to receive electromagnetic radiation [visible and invisible] which is passed by the mirror coating and which produces a corresponding control signal. This control signal provides an input to the control circuit elements 31b which adjusts the power output and thus the corresponding brightness, in the present example, of the individual LEDs.

It should be understood that individual LEDs 32a may be manufactured which produce other wavelengths or perceivable colors, such as amber, green, or infrared, however, in such a case, the mirror employed with same would either include specific areas whose individual transmission characteristics would be substantially matched to the spectral bands of light which are emitted by the LEDs which are immediately adjacent thereto, or in the alternative, would be operable to pass the selected spectral bands of electromagnetic radiation which are emitted or received by the assemblies enclosed within the housing 20. A commercially available LED which fits these performance parameters or characteristics, as illustrated in FIG. 2, is manufactured by Hewlett Packard of San Jose, Calif. under the trade designation HPWR-A300. The commercially available LED, which is noted above, has high efficiency, and is an ultra-radiant red LED having a peak wavelength which falls substantially within the 630–680 nanometer band. It should be understood, that each of the respective LEDs has a transmission path which is substantially oriented in a direction which is generally perpendicular to the circuit board 40. Suitable electrical leads 33 electrically connect the bank of LEDs 31 with the braking, or directional signalling assemblies [not shown], as well as a source of power which is borne by the overland vehicle.

The receiver and/or emitter of electromagnetic radiation 30 includes, as earlier discussed, a circuit board 40 which has a top or forwardly facing surface 41, and a back, or rearwardly facing surface 42. The circuit board further has a peripheral edge 43 which is shaped in a predetermined fashion such that the circuit board may mate, or otherwise nest within the housing 20. FIGS. 2 and 4 illustrate views of the top plan, or forwardly facing surface of the circuit board. It should be understood that the circuit board may be utilized on the left, and right side, respectively of the overland vehicle [not shown]. The electrical leads as shown in FIG. 2 are oriented on the right side of the circuit board and facilitate wire routing to the braking, directional signalling assembly, power supply and other control circuitry of the overland vehicle [not shown]. FIG. 5 shows the bottom plan view of the same circuit board. It is to be understood that a circuit board which is used on the passenger side of the vehicle (as seen in FIG. 4) is substantially a mirror image of that used on the driver's side and which is depicted in FIG. 2. In this regard, the electrical leads 33 which are illustrated in FIGS. 4 and 5, respectively, are oriented on the left side, as viewed in FIG. 4, of the circuit board and facilitate wire routing to the braking, directional signalling assembly, power supply and other control circuitry of the same overland vehicle [not shown].

Referring more particularly now to FIG. 4, the array or bank of LEDs 31 is generally mounted on the top or forwardly facing surface 41 of the circuit board 40 and disposed in a generally hexagonal and matrix-like pattern. As will be discussed in greater detail, hereinafter, and depending upon the signal desired to be transmitted to a person or location positioned outside of the overland vehicle, it may be possible to energize all of the LEDs 31, and have them remain energized to represent a specific signal; or alternatively, it is possible to energize a subset, or smaller number of the bank LEDs and have them flash in a predetermined pattern to represent other possible signals such as a left or right turn signal; braking; or possibly a signal indicating that the overland vehicle is backing up, as by the use of a rapidly intermittent or strobe light flashing pattern. It should be understood, therefore, that the array of LEDs constitutes a semi-reconfigurable matrix display whose apparent outline is determined by the circuit board, and whose relative brightness changes substantially in concert with the ambient lighting levels sensed by the photo detector 31a as discussed above.

As best seen in FIG. 2, substantially hexagonal reflectors 44 are operable to matingly engage the circuit board 40 at predetermined locations by means of a pair of pins which are generally indicated by the numeral 45. It should be understood that the hexagonal reflectors include an internal boundary 50 which has a highly reflective surface applied thereto as by means of vacuum metalization or similar techniques which are well known in the art. The individual reflectors 44 are operable to reflect electromagnetic energy from the emitter outwardly from the circuit board. The individual reflectors 44 may be manufactured, in the alternative, as a single reflector having individually discreet reflector cups which are substantially similar to the single reflectors illustrated. Of course, when the single reflector is employed, the individual pins are not required, rather only a few pins are necessary and are positioned around the perimeter of the reflector to orient and secure the single reflector in a proper position on the circuit board. As best seen by reference to FIG. 3, and positioned immediately forward of the circuit board 40, and the hexagonal reflector 44, is an array of convexo-convex lenses 60. As best seen by reference to FIG. 3, the array of convexo-convex lenses 60 are formed in a single transparent plastic piece 61. In the single piece 61 there is provided a single, convexo-convex lens which is disposed in registration with each of the individual reflectors 44. The convexo-convex lens array is configured, or otherwise arranged, such that the center of each of the respective lenses are disposed in substantial alignment with the beam center for each of the respective LEDs 32. The lens array further serves to collimate the light emitting from the respective LEDs, and which has been reflected in a forward direction by the reflector 44 and further to magnify the apparent LED luminous area, that is, the area of luminosity which can be readily discerned by the human eye. A baffle assembly 71 is positioned intermediate the mirror and the receiver or transmitter of electromagnetic radiation 30. The baffle assembly of the preferred embodiment includes a polymeric based light control film which permits ambient, or artificial light generated by the electromagnetic emitter to escape from the housing 20. The light control film, a variety of which is manufactured by 3M Company under the trade designation LCFS ABRΦ35 OB 48CLR GLS 0.025" is a thin plastic film enclosing a plurality of closely spaced, black colored microlouvers. The light control film is approximately 0.025 inches [0.75 millimeters] thick, and the microlouvers are spaced approximately 0.005 inches apart [0.127 millimeters]. The microlouvers may be a transparent black, or an opaque black, and further, the microlouvers may be positioned in various angular positions and at various spacings to provide a viewing angle, as in the case of visible light, which may include angles as narrow as 48 degrees plus or minus 6 degrees, or as wide as 90 degrees plus or minus 15 degrees. It should be understood that the baffle assembly permits light emitted by the electromagnetic radiation source 30 to escape within a predetermined viewing angle from the housing 20, and travel rearwardly and outwardly relative to the overland vehicle, not shown. Further, the baffle assembly is operable to inhibit, or block, the light emitted by the electromagnetic emitter 30 from travelling outside the predetermined viewing angle and into the view of the operator of the overland vehicle [not shown]. In the preferred embodiment, the baffle assembly is laminated or otherwise attached or made integral with the rearward facing surface of the mirror by means of various adhesive vehicles which are well known in the art. As earlier indicated, the mirror will be discussed in greater detail hereinafter. The mirror assembly 10 further includes first and second fresnel prism sheets 80 and 90, respectively. Each of the fresnel prism sheets utilized is positioned intermediate the receiver or emitter of electromagnetic radiation 30, and the baffle assembly 71. Each prism sheet serves to bend or otherwise redirect the collimated light which is passed through the array of convexo-convex lenses 60. The light is bent by the prism sheets towards the predetermined viewing angle established by the baffle assembly 71 to minimize light loss, or in other words, in such a fashion as to align the axis of the peak beam intensity of the individual LEDs 32 with the peak transmission axis of the baffle assembly. The individual fresnel prism sheets may also be used to deflect the light upwardly or downwardly relative to the position of the mirror assembly 10 as it is mounted on the overland vehicle [not shown]. This deflection or directional orientation of the emitted light upwardly, or downwardly, is achieved by rotation of the individual fresnel prism sheets within a plane which is substantially parallel to the mirror, prior to assembly of the mirror assembly 10. This deflection or directional orientation of light is useful in compensating for height differences, relative to the surface of the earth, which may exist between the mirror assembly 10, as mounted on a predetermined overland vehicle, and for example, observers seated in vehicles in a adjoining traffic lane. Therefore, the individual fresnel prism sheets are selected in such a fashion so as to cause the electromagnetic radiation which is received or emitted by the mirror assembly 10 to be directed along a predetermined path appropriate for the specific vehicle platform upon which it is employed. In an alternative design, the individual prism sheets may be replaced by a deviator sheet (not shown) which may be of a fresnel, refractive design, or in the alternative a hybrid, refraction/total internal reflection [TIR] type design.

A black mask comprised of a substantially opaque paint or other similar coating or substance 100, is typically applied to the mirror in areas not covered by the baffle assembly and thereby outlines the area through which light or other electromagnetic radiation passes. This mask is applied normally to the rearward surface of the mirror. The mirror will be discussed in the paragraphs which follow. It should be understood, however, that in certain circumstances, and wherein the combined luminous reflectance and absorbance of the mirror coating exceed approximately 85%, this mask may be omitted.

As best seen by reference to FIGS. 1 and 3, the mirror assembly 10 of the present invention includes a semitransparent mirror 110 which selectively passes, and reflects electromagnetic radiation having predetermined wavelengths. As explained earlier, the receiver and/or emitter of electromagnetic radiation 30 is operable to produce or receive electromagnetic radiation having the wavelength characteristic which include the spectral band of electromagnetic radiation which is passed or otherwise transmitted by the mirror 110. In the examples provided hereinafter, the mirror 110 is operable to transmit the spectral band which includes 630–680 nanometers, and which corresponds with the perceived visible spectrum color red. Of course, should a different visible color or non-visible spectral band be desired, then, in that event, a different mirror would be selected which would preferentially transmit or pass the selected wavelength corresponding to the spectral band selected. It should be understood that the mirror 110 is operable to transmit or pass wavelengths which predominantly fall within the predetermined spectral band selected and which is normally not greater 100 nanometers in width for an ultraviolet or visible spectral band; 300 nanometers for an infrared band; and 2 to 3 millimeters for a radio, or microwave band.

As best seen in the drawings, the mirror 110 has a forwardly facing surface, and a rearwardly facing surface upon which the opaque mask 100 is applied. As earlier discussed, it should be understood that the word "forward," when referring to the mirror assembly 10, means that the mirror assembly is positioned or otherwise oriented such that an operator may view rearwardly of the vehicle [not shown] when the operator is seated in the passenger compartment of the overland vehicle. In this regard, the mask 100 is operable to substantially inhibit any light leakage from the electromagnetic emitter 30 which is positioned internally of the housing 20, and thereby outlines a graphic shape of the emitter array. Further, the opaque mask prohibits excessive ambient light from entering the mirror assembly 10 through any mirror surface extending beyond the peripheral edge of the baffle assembly 71.

In order to accomplish the foregoing objectives, the mirror 110 of the present invention includes a mirror coating having a non-periodic succession or stack of materials in a layered interference filter structure. As noted earlier, a periodic structure is one which is defined as having materials which recur, and which further has the same thickness. In the present invention, the mirror coating has a non-periodic structure. This means the individual layers of the filter recur, but have irregular thicknesses. The mirror coating, as noted above, has one or more layered materials which have a complex refractive index which is wavelength dependent, and wherein the real component is dominant, and the imaginary component is negligible within a predetermined band pass region. Additionally, the imaginary component is substantial within a spectral region other than the predetermined band pass region. More specifically, the refractive index of this material may be represented by the expression $[n+ik]_\lambda$ wherein n represents the real component of the refractive index, and the ik represents the imaginary component each for a given wavelength $\lambda$. For the present invention, materials are selected wherein the real component range from approximately 1.5 to 4 depending on the wavelength and materials selected, and wherein k ranges from 2.5 to 0 depending on the specific materials and wavelength selected. In this formula, i is the unit vector in the imaginary axis, and k is the coefficient known as the extinction coefficient and which is related to the absorption coefficient and which is known by the relationship:

$$\alpha = \frac{45\pi k}{\lambda}$$

In this regard, the mirror coating imparts to the mirror 110 substantially neutral reflected chromaticity as measured using a white reflected source such as CIE—Illumination C, D65, E or B; has a peak transmittance not less than 60% within the predetermined band pass region; has peak absorbance not less than 30% within regions other than the predetermined spectral band pass region; and which simultaneously has a luminous reflectance greater than 50% of the ambient light striking the mirror coating.

An example of the mirror coating composition which may be applied to either the forward or rearwardly disposed surfaces of mirror 110 by conventional deposition techniques, is set forth below. In the example provided, the non-periodic stack of materials are referred to as a first layer, second layer, etc. In each of these instances, it should be understood that the first layer of material is applied immediately to the forward or rearward facing surface of the mirror 110. Subsequent layers, that is, the second layer, is applied immediately to the top or exposed surface of the first layer, and the third layer is applied to the top or exposed surface of the second layer, etc. An example of the preferred form of the mirror coating is set forth below:

EXAMPLE

The mirror coating composition, as described above, includes a coating which has a non-periodic stack of materials which includes: a first layer (121) of ferric oxide ($Fe_2O3$) having a thickness dimension of about 95 nanometers: a second layer (122) of silicon dioxide ($SiO_2$) having a thickness dimension of about 35.50 nanometers; a third layer (123) of ferric oxide having a thickness dimension of about 51.50 nanometers; a fourth layer (124) of silicon dioxide having a thickness dimension of about 103.00 nanometers; and a fifth layer (125) of ferric oxide having a thickness dimension of about 22.50 nanometers.

The mirror coating composition, above, is best understood by a study of FIG. 6, and wherein the composition is shown with respect to its percentage reflectance, transmittance and absorbance as compared with wavelength in nanometers. Further, the emitter output, or receiver response is illustrated in relative comparison to the other indicia. As shown therein, the mirror coating of the present composition achieves a luminous reflectance of greater than 51.53% at approximately a 30 degree angle of incidence [AOI]. Further, the reflective properties of this mirror coating are substantially neutral, that is, it has a 1931 CIE x and y color coordinates of 0.306 and 0.320, respectively, when illuminated by white light. It being understood that a perfectly neutral mirror has 1931 CIE x and y color coordinates of 0.3333 and 0.3333, respectively. Further, the same mirror coating composition has a peak transmittance of greater than 70% at the in-band frequency of 680 nanometers. This same coming is shown graphically in FIG. 7 in a greatly exaggerated view and wherein coating the is designated generally by the number 120 and the respective layers are identified by the numerals 121–125.

It should be understood, that the thickness dimension of each of the layers discussed above may be varied by as much 2% without irreparably altering its performance characteristics. Similarly, for each of the coming compositions discussed above, adjustments may be made for stoichiometric variations in the materials which are actually deposited or made integral with the individual layers. For example, the oxidation state has an impact on the refractive index coefficients. Therefore, different deposition techniques may result in slightly different layer density and oxidation levels with a corresponding change, or shift in the refractive index. However, one skilled in the art will be able to compensate for this change or shift by varying the thickness of the individual layers in a way to compensate for these stoichiometric variations.

OPERATION

The operation of the present invention is believed to be readily apparent and is briefly summarized at this point. As best understood by a study of FIGS. 2, 3, 6 and 7, a mirror assembly 10 for reflecting light forming a perceivable image into the line of sight of an observer [not shown] and further, for emitting or receiving electromagnetic radiation which forms various signals includes, an enclosure or housing 20 defining an aperture 23 and wherein, an assembly, herein shown, as a receiving and/or transmitting device and/or sensor of electromagnetic radiation 30, is borne by the enclosure, and is operable to emit or receive signals formed of electromagnetic radiation within a predetermined spectral band or region. The mirror assembly 10 further includes a mirror 110, which is borne by the enclosure, and which is positioned in the aperture. The mirror 110 is coated with a mirror coating which exhibits substantially neutral reflected chromaticity as observed with reflected ambient natural light, has a peak transmission of not less than 60% for the electromagnetic radiation within a predetermined band pass spectral region, and has a peak absorbance not less than 30% for electromagnetic radiation which is within a selected spectral region other than the predetermined spectral band pass region.

As will be recognized by a study of FIG. 6, the luminous reflectance for the mirror coating disclosed exceeds 50% while simultaneously maintaining a peak transmission in the predetermined spectral band of light, which includes 630–680 nanometers in excess of 70%.

In summary, therefore, it will be seen from the disclosure above, that the mirror coating of the present invention provides a fully dependable and practical means by which a mirror assembly 10 can be assembled and which includes a mirror 110 having substantially neutral reflected chromaticity, as observed with reflected ambient light, has a peak transmittance not less than 60% within a predetermined spectral band pass region, has a peak absorbance not less than 30% within a spectral region other than the predetermined spectral band pass region, and which simultaneously has a luminous reflectance greater than 50% for the ambient light striking the mirror coating. In addition to the foregoing, the improved mirror coating of the present invention is non-periodic, and further exhibits substantial insensitivity to spectral characteristic variations attributable to angle of incidence variations within a broad range of useful angles.

It should be apparent to those skilled in the art that the foregoing example of the invention has been made for the purposes of illustration and that variations of the usual magnitude may be made in proportions, procedures and material without departing from the scope of the present invention. Therefore, it is intended that this invention not be limited except by way of the claims which follow.

Having described my new invention what I claim as new and desire to secure by Letters Patent of the United States is:

1. A mirror coating comprising a non-periodic succession of materials in a layered interference filter structure and wherein the mirror coating exhibits substantially neutral reflected chromaticity as observed with reflected ambient light, has a peak transmittance of not less than 60% within a predetermined spectral band pass region, has a peak absorbance of not less than 30% within a spectral region other than the predetermined spectral band pass region, and which simultaneously has a luminous reflectance of greater than 50% for the ambient light striking the mirror coating, and wherein the mirror coating comprises:

a first layer of ferric oxide having a thickness of about 95 nanometers;

a second layer of silicon dioxide having a thickness of about 35.50 nanometers;

a third layer of ferric oxide having a thickness dimension of about 51.50 nanometers;

a fourth layer of silicon dioxide having a thickness dimension of about 103.00 nanometers; and a fifth layer of ferric oxide having a thickness dimension of about 22.50 nanometers.

2. A mirror coating as claimed in claim 1 and wherein the thickness of each of the individual layers may vary by about 2% or less.

* * * * *